March 19, 1968     J. W. JACOBS     3,374,336
INFINITE HEAT SWITCH FOR AN INFRARED HEATING UNIT
Filed May 3, 1965     2 Sheets-Sheet 1
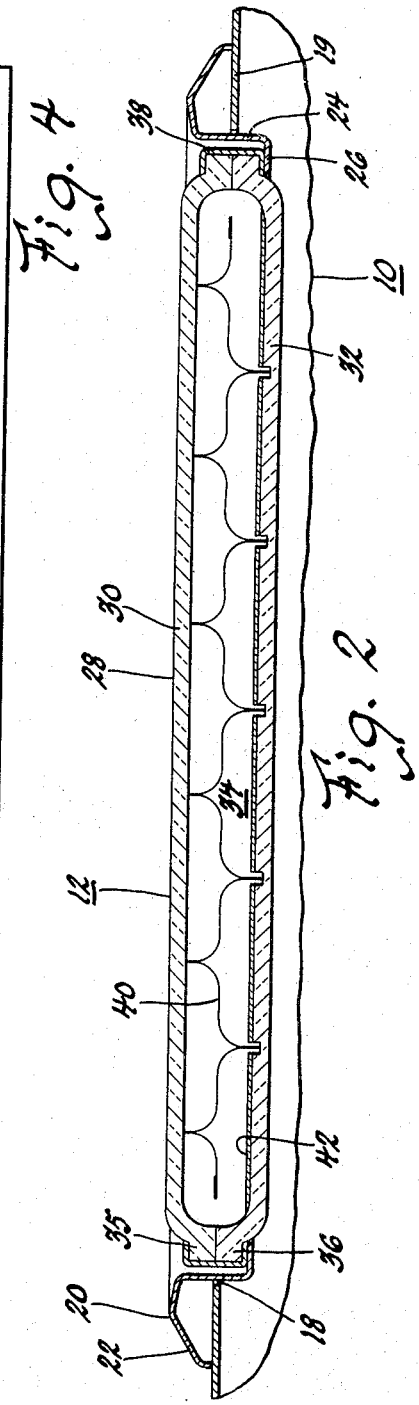
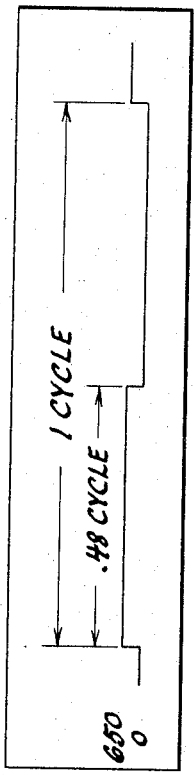
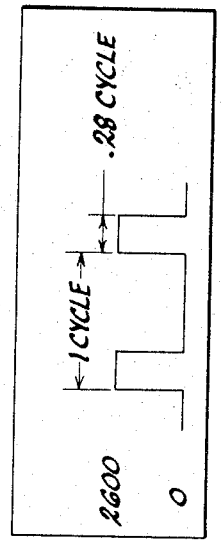
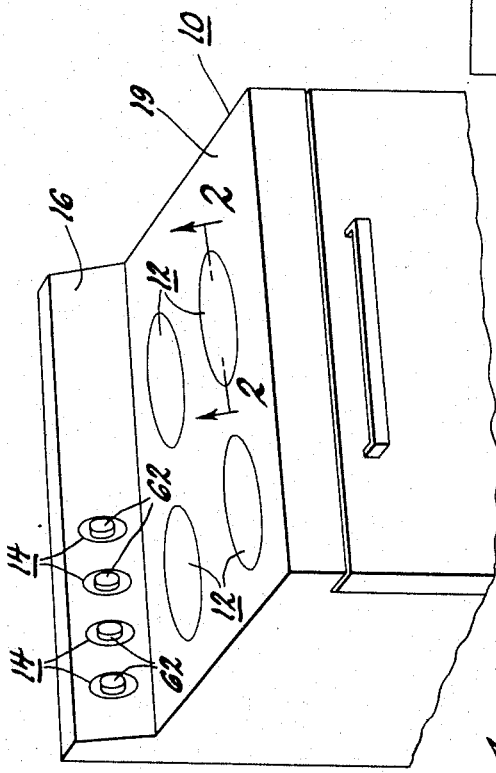
INVENTOR.
James W. Jacobs
BY J.C. Evans
HIS ATTORNEY

| INPUT PERCENTAGES | | | |
|---|---|---|---|
| SETTING | VOLTAGE | % ON | AV'G. WATTS |
| WARM | 118 | 20% | 130 |
| SIMMER | 118 | 28% | 182 |
| LOW | 118 | 48% | 312 |
| MED. LOW | 236 | 28% | 728 |
| MED. HIGH | 236 | 40% | 1040 |
| HIGH | 236 | 100% | 2600 |

INVENTOR.
James W. Jacobs
BY
J. C. Evans
HIS ATTORNEY

United States Patent Office 3,374,336
Patented Mar. 19, 1968

3,374,336
INFINITE HEAT SWITCH FOR AN
INFRARED HEATING UNIT
James W. Jacobs, Dayton, Ohio, assignor to General
Motors Corporation, Detroit, Mich., a corporation
of Delaware
Filed May 3, 1965, Ser. No. 452,719
2 Claims. (Cl. 219—452)

ABSTRACT OF THE DISCLOSURE

In preferred form, an improved infinite controlled heat switch for an infrared surface unit wherein a thermally responsive pulser and voltage selector switch provide a low voltage circuit with relatively long "on-off" pulsing cycle periods for low preselected temperatures and a high voltage circuit with shorter "on-off" pulsing cycle periods for higher preselected temperatures.

This invention relates to infinite heat control switches and more particularly to infinite heat control switches including power pulsating means of the type adapted to pulsatingly energize electrical resistance elements in surface heating units and the like.

In controlling the wattage input to the heating element of a surface heating unit on a domestic range, it is desirable to cyclically make and break the energization circuit of the heating element to obtain an infinite control of wattage input to produce variable heat output from the heating unit suitable for a wide range of cooking effects.

Furthermore, it is desirable to cyclically control the energization circuit in a manner wherein the "on" period for a particular "on-off" cycle period is increased to produce a more accurate control of the wattage input to the heating element. One such arrangement is shown in United States Patent 2,870,313 to F. H. McCormick, issued Jan. 20, 1959. While such arrangements are suitable for their intended purpose, the "on-off" cycle period is maintained constant throughout the control of the unit. In certain applications, as for example when the infinite switch is associated with an infrared surface heating unit wherein it is important to maintain energization of the heating element over a relatively extended period of time to produce a temperature increase of the heating elements sufficient to produce an effective infrared radiation effect therefrom, it is desirable in certain cases to vary the length of the "on-off" cycle period.

Accordingly, an object of the present invention is to improve infinite heat switches for pulsatingly controlling the energization of an electrical heating element in a surface heating unit or the like wherein power pulsing means are included adjustable to vary the "on" time of the heater element for a particular cycle of operation by the provision of a selector switch means operable upon adjustment of the infinite heat switch to selectively connect the heating element across first and second voltages of a plural voltage power source wherein the selector switch means is electrically connected with the power pulsing means to increase the length of the "on-off" cycle period during energization of the heater element at low voltages.

A further object of the present invention is to improve infinite heat switches having power pulsing means for controlling the wattage input to an electrically energizable heater element wherein the power pulsing means includes means for adjusting the "on" time during a predetermined pulsing cycle and further includes electrically energizable self-heating means and thermally responsive means for controlling a pair of contacts to produce the power pulsing control by the provision of a selector switch means operable to connect the heating element across a plurality of voltage sources and electrically connected to the self-heating means of the power pulsing means for modulating the controlling action thereof upon connection of the heating element to a predetermined low voltage for increasing the length of the "on-off" cycle period to reduce thermal shock in the heating element.

Yet another object of the present invention is to improve infrared surface heating units of the type having an energizable heating element operable in the infrared range by including in combination with the infrared radiant heating element an infinite heat switch including power pulsing means for controlling the wattage input to the infrared heating element and selector switch means operative to selectively connect the heating element to first and second voltage sources wherein the selector switch means is electrically associated with the power pulsing means to modulate the controlling action thereof to lengthen the "on-off" cycle period thereof at low voltages to extend the time period of energization of the heating element to improve the effective infrared radiation therefrom.

Further objects and advantages of the present invention will be apparent from the following description, reference being had to the accompanying drawings wherein a preferred embodiment of the present invention is clearly shown.

In the drawings:

FIGURE 1 is a view in perspective of a domestic range including the present invention;

FIGURE 2 is an enlarged vertical sectional view taken along the line 2—2 of FIGURE 1;

FIGURE 3 is a diagrammatic showing of the "on-off" cycle period at one control setting of an infinite heat switch of the present invention;

FIGURE 4 is a diagrammatic showing of an "on-off" cycle period of another control setting of the switch;

Figures 5, 6:
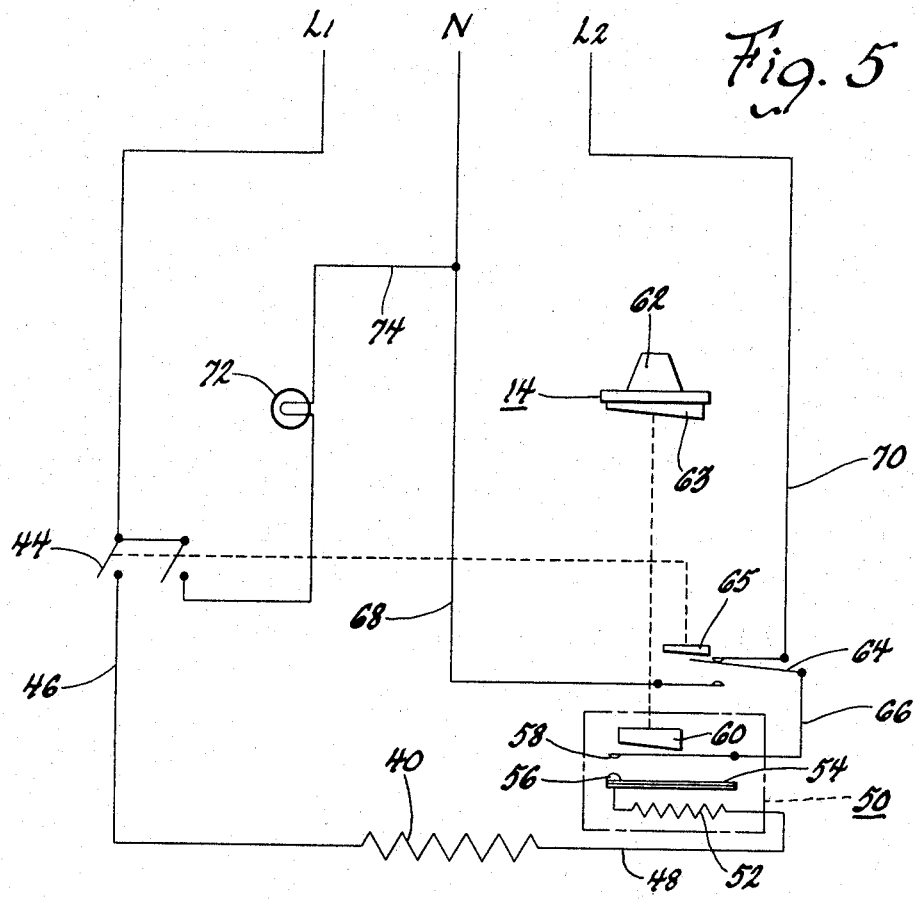
FIGURE 5 is a schematic wiring diagram of the embodiment of the present invention.
FIGURE 6 is a chart showing the input wattage control of the present invention at several control settings.

Referring now to the drawings, in FIGURE 1, a domestic electric range 10 is shown having a plurality of surface heating units 12 thereon selectively energizable by infinite heat control switches 14 representatively shown as being disposed on a rearwardly located control panel 16 of the range 10. Each of the units 12 is disposed within an opening 18 formed in a sheet metal upper surface 19 of the range 10 as best seen in FIGURE 2. Around each of the openings 18 is located a unit supporting ring 20 including an upper portion 22 supportingly received by the top surface of the range 10 and a downwardly depending portion 24 having a radially inwardly turned end portion 26 for supportingly receiving the unit 12.

The units 12 are each representatively illustrated as including a low-profile envelope 28 having a generally circular upper utensil supporting plate 30 and a generally circular lower bearing plate 32 spaced below the upper plate 30 to form a space 34 therebetween. The upper plate 30 is constructed from a suitable electrical insulating, high-strength, infrared transmissive material such as quartz, a recrystallized glass ceramic such as Cer-Vit manufactured by Owens Illinois, or the like. Preferably, the lower plate 32 is formed of a suitable electrically insulating ceramic material such as alumina, steatite or the like having a low-thermal mass.

In the illustrated embodiment, the plates 30, 32 each has a peripheral edge 35, 36, respectively, formed continuously therearound and arranged so that the edge 35 of the upper support plate 30 is supportingly received on the edge 36 of the lower bearing plate 32. The plates 30, 32 are joined at their peripheral edges 35, 36 by a continuously formed ring member 38 that is fitted over the edges 35, 36, as best seen in FIGURE 2, to hold the plates together and to seal against the entrance of foreign matter from exteriorly of the envelope 28 into the interior space 34 thereof. The lower bearing plate 32 is supportingly received at its edge 36 by the radially inwardly turned edge 26 on the support ring 20.

Within the interior space 34 is located a continuously formed self-supporting electrical resistance heating element 40 adapted to be electrically connected across terminals for supplying the wattage input to the heating element 40. The element 40 is energizable to produce an effective infrared radiation therefrom and is constructed of a high-temperature electrical resistance material from a nickel chromium family or an iron chromium family or the like having desirable strength and electrical characteristics when the element 40 is self-heated into the range of 1500° F. to 2000° F.

In such arrangements when the heating element 40 is energized to a predetermined temperature, emitted infrared energy therefrom either directly passes through the infrared transmissive upper plate 30 or is directed against an infrared reflective layer 42 on the lower bearing plate 32 for reflection back through the upper plate 30. Since the heater coil 40 is maintained in spaced relationship to both the low thermal mass lower bearing plate 32 and the infrared transmissive upper plate 30, it is quickly responsive upon being connected across a power source to self-heat to a predetermined elevated temperature for effective infrared emulsion. Accordingly, the unit can be characterized as having a very low thermal lag as compared to sheathed type surface heating units.

The illustrated infrared surface heating unit is merely representative of one typical infrared surface heating unit suitable for association with the present invention and for a more complete explanation of the structure illustrated in FIGURE 2, reference is hereby made to United States Patent 3,316,390 to R. S. Gaugler, et al., issued Apr. 25, 1967.

In such infrared surface heating units the heat transfer between the surface heating unit and the utensil supported thereon through infrared radiation heat transfer is a function of the fourth power of the temperature differential between that of the heating element 40 and the article being heated. Since the heating element normally operates in the range of 1500° F. to 2000° F. and the supported utensil is generally at a much lower temperature, the effective heat transfer is relatively substantial.

In accordance with certain principles of the present invention to improve the effective heat transfer by infrared radiation from the surface heating unit 12 to a supported utensil, the heating element 40 is associated with one of the infinite heat control switches 14 best shown in the circuit diagram of FIGURE 5. In the circuit of FIGURE 5, a three-wire power source is shown including wires $L_1$, N and $L_2$. The wire $L_1$ is connected through a double-pole, double-throw "on-off" switch 44 to a conductor 46 electrically connected to one end of the continuous heating element 40 of the unit 12. The opposite end of the heating element 40 is connected to a conductor 48 that is electrically connected to a power pulsing unit 50 of the type more particularly set forth in United States Patent 2,623,137 issued Dec. 23, 1952.

The power pulsing unit 50 more particularly includes an energizable heater 52 that is electrically connected to the conductor 48 and located in heat transfer relationship with a thermally responsive element 54 shown as being a bimetallic strip having a movable contact 56 carried on one end thereof and movable upon deflection of the element 54 with respect to a fixed contact 58 adjustably biased with respect to the movable contact 56 and element 54 by cam means 60 operatively positioned upon manual adjustment of a control knob 62 of the infinite heat switch 14. As shown in the chart of FIGURE 6, the control knob 62 has indicia thereon related to the wattage input to the heating element 40.

In the illustrated arrangement, adjustment of knob 62 also positions the "on-off" switch 44 through a cam 63 and also positions a selector switch 64 of the single-pole, double-throw type through a cam 65. The switch 64 is electrically connected by a conductor 66 to the contact 58 and adjustably positioned to serially connect the heating element 40 and power pulsing unit 50 through a conductor 68 to the neutral wire or through a conductor 70 to the wire $L_2$ of the power source. The control circuit further includes a pilot lamp circuit connected between wires $L_1$ and N by switch 44 that energizes an indicating lamp 72 in a conductor 74 connected between the switch 44 and wire N.

The power pulsing unit 50 in the circuit of FIGURE 3 is of the thermally actuated type that can be characterized by having predetermined "on-off" cycles of operation that are substantially of constant length throughout the controlling range of the pulsing unit 50. To obtain control of input wattage to an energizable heater unit such as the infrared resistance ribbon 40, the fixed contact 58 is adjustably positioned by cam means 60 in response to setting of the control knob 62. By varying the bias of the fixed contact 58 against the movable contact 56 of the pulsing unit 50, the "on" time during a control cycle can be adjusted to produce a desired control of input wattage to the heater unit 40.

In accordance with certain principles of the present invention, the pulsing unit 50 is selectively connected across a high and low-voltage power source to improve the effectiveness of control thereof and to reduce thermal cycles in an associated heater unit thereby reducing the thermal shock to the unit to improve the life characteristics thereof.

More particularly, in the illustrated arrangement, when the control knob 62 is set at "medium-low," "medium-high" or "high" settings, the heating element 40 is connected across wires $L_1$, $L_2$ through an energization circuit from wire $L_1$ to the "on-off" switch 44, conductor 46, through heating element 40, conductor 48, thence through heater winding 52 of the pulsing unit 50, across the contacts 56, 58 previously closed by positioning of the control knob 62, thence through conductor 66, the selector switch 64 and conductor 70 to wire $L_2$. Thus, at the higher infinite heat switch control settings the selector switch 64 is operative to connect the heating element 40 across a high-voltage source and furthermore to electrically connect the pulser unit 50 heater winding 52 across the same high voltage source to produce an "on-off" cycle of a first predetermined length having an average wattage input of 2600 watts for a complete cycle across 236 volts. This "on-off" cycle is illustrated in FIGURE 3 wherein the contacts 56, 58 are on for 28% of the cycle length to produce an average input wattage of 728 volts when the heater is connected across 236 volts at the "medium-low" setting.

In accordance with certain principles of the present invention, when the infinite heat switch 14 is positioned at "warm," "simmer" or "low" positions, the heating element 40 and pulsing unit 50 are connected across a low-voltage source through an energization circuit from wire $L_1$ through "on-off" switch 44, conductor 46, heating element 40, conductor 48, thence through the heater winding 52 of the pulser 50, closed contacts 56, 58 thereof as established by setting the control knob 62 to a desired control setting, thence, through conductor 66, the selector switch 64 that is positioned to connect conductor 66 to the conductor 68, thence to the neutral wire. Since the controlling action of the pulser 50 is dependent upon the heat output of the heater winding 52, which is a function of the square of the voltage thereacross, when the voltage is reduced by half the heat output of the heater winding 52 is reduced by one-fourth to produce a substantial change in the length of the control cycle of the pulser 50. In the illustrated arrangement for a low setting on 118-volts to control the input wattage to an average wattage of 312 watts, the pulser 50 has the contacts 56, 58 closed for an "on" period representing 48% of the cycle which is by virtue of the pulser 50 being connected across the low voltage heating element energization circuit substantially lengthened as shown in FIGURE 6.

By substantially lengthening the control cycle or the "on-off" period to control the input wattage to the heating element at low heat output settings, the contacts 56, 58 are opened a lesser number of times during the controlling operation to thereby reduce the temperature variations in the heating element 40 whereby the heating element 40 is subjected to less thermal shock. Furthermore, since the contacts 56, 58 open a lesser number of times during the controlling operation at the lower heat output settings, there is a reduction in the wear of the contacts themselves.

Furthermore, when the control circuit of FIGURE 3 is in combination with an infrared surface heating unit, the provision of a substantially lengthened control cycle at the low heat settings produces a resultant holding of the heating element at an elevated temperature in the infrared range. Since the heat transfer effectiveness of the heating element 40 through infrared radiation is dependent upon the temperature differential of the heating element and the object being heated thereby to the fourth power, the maintenance of the heating element at the elevated temperatures materially improves the efficiency of the heating element as an infrared heating device.

Another feature of the invention is that by lengthening the control cycle through the lower heat output settings the heating element 40 will have a lesser tendency to operate between the visible and invisible light ranges. Since the heating element 40 is maintained energized for longer periods of time, it will remain in the visible light range longer so as to reduce the visible light changes emanating from the unit that can be objectionable if the unit were to pulse at a greater rate.

From the above-described embodiment of the invention, it will be appreciated by those skilled in the art that the provision of means for selectively connecting a heating element across a high-voltage and a low-voltage source by a selector switch that concurrently conditions a power pulsing unit to vary the cycle length of the pulser unit in accordance with the energization voltage across the heating element produces a resultant control of input wattage to the heating element that reduces thermal shock in the heating element; reduces contact wear in the power pulsing unit; increases the efficiency of the infrared radiation from the heating element; and reduces the visual light pulsations in an infrared heating element.

While the embodiment of the present invention as herein disclosed constitutes a preferred form, it is to be understood that other forms might be adopted.

What is claimed is as follows:

1. In combination, an infrared surface heating unit including a ribbon-shaped electrical resistance heating element, a low-profile envelope surrounding said heating element including an upper support surface of infrared transmissive material and a lower bearing plate spaced from said upper plate having a low thermal mass, means for supporting said heating element out of direct heat conductive relationship with said upper and lower plates, an infinite heat switch including power pulsing means for pulsatingly energizing said heating element, said infinite heat switch including means for varying the controlling action of said power pulsing means to produce a variable heat output from said heating element by varying the "on" time thereof, said power pulsing means including a pair of contacts, a thermally responsive means supporting one of said contacts and an electrically energizable self-heating element for heating said thermally responsive means to position one of said contacts to produce pulsating energization of said heating element, means for positioning the other of said contacts for varying the "on" time of said heating element, said infinite heat switch including selector switch means for selectively connecting said heating element across a low-voltage power supply and a high-voltage power supply, said selector switch means being electrically connected to said electrically energizable self-heating element for varying the "on-off" cycle period of said power pulsing means in accordance with the voltage energizing said heating element, said power pulsing means having an increased "on-off" cycle period for improving the infrared radiation effectiveness of said heating element during energization thereof at low voltages.

2. An infinite heat switch for association with a surface heating unit including an electrical resistance heating element comprising, power pulsing means for controlling energization of the heating element, said power pulsing means including adjustable means for varying the energization for the heating element in accordance with a desired heat output therefrom, selector switch means electrically connected to said power pulsing means responsive to said adjustment means to electrically connect the heating element across first and second power supplies having first and second voltages, said power pulsing means being responsive to connection of the heating element across a lower voltage power supply to increase the "on-off" cycle period of the heating element for reducing thermal shock thereof, said power pulsing means including a pair of contacts, thermally responsive means connected to one of said contacts and electrically energizable self-heating means for controlling said thermally responsive means to move said one of said contacts with respect to the other of said contacts to pulsatingly control energization of the heating element, said other of said contacts being movable by said adjustable means to vary the "on" time of the heating element, said selector switch means being electrically connected to said electrically energizable self-heating means and operative to connect said self-heating means to power supplies having different voltages whereby the "on-off" cycle period of said power pulsing means is varied in accordance with the voltage supply across the heating element to reduce the thermal shock of the heating element produced by energization thereof.

References Cited

UNITED STATES PATENTS

| | | | |
|---|---|---|---|
| 2,623,137 | 12/1952 | Vogelsberg | 200—152 |
| 2,824,941 | 2/1958 | Fry | 219—452 |
| 2,870,313 | 1/1959 | McCormick | 219—452 |
| 3,316,390 | 4/1967 | Gaugler et al. | 219—464 |

RICHARD M. WOOD, *Primary Examiner.*

ANTHONY BARTIS, *Examiner.*

L. H. BENDER, *Assistant Examiner.*